(12) United States Patent
Mizuguchi et al.

(10) Patent No.: US 10,301,724 B2
(45) Date of Patent: May 28, 2019

(54) ELECTROCHEMICAL REACTION DEVICE (71) Applicant: KABUSHIKI KAISHA TOSHIBA, Minato-ku (JP)

(72) Inventors: Koji Mizuguchi, Kawasaki (JP); Shuichi Uchikoga, Shibuya (JP); Hideyuki Tsuji, Yokohama (JP); Satoshi Mikoshiba, Yamato (JP); Akihiko Ono, Kita (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 15/453,654

(22) Filed: Mar. 8, 2017

(65) Prior Publication Data
US 2018/0080130 A1   Mar. 22, 2018

(30) Foreign Application Priority Data

Sep. 21, 2016 (JP) ................. 2016-184084

(51) Int. Cl.
| C25B 15/08 | (2006.01) |
| C25B 1/00 | (2006.01) |
| C25B 9/08 | (2006.01) |
| C25B 1/46 | (2006.01) |
| C25B 9/00 | (2006.01) |
| C25B 3/00 | (2006.01) |
| C25B 3/04 | (2006.01) |
| C25B 1/04 | (2006.01) |
| C25B 11/04 | (2006.01) |
| H01G 9/20 | (2006.01) |

(52) U.S. Cl.
CPC .............. *C25B 3/04* (2013.01); *C25B 1/003* (2013.01); *C25B 1/04* (2013.01); *C25B 11/0405* (2013.01); *C25B 11/0415* (2013.01); *H01G 9/2013* (2013.01); *Y02E 60/366* (2013.01)

(58) Field of Classification Search
CPC .. C25B 15/08; C25B 1/00; C25B 9/08; C25B 1/46; C25B 9/00; C25B 3/00
USPC ....................................... 204/242
See application file for complete search history.

(56) References Cited

U.S. PATENT DOCUMENTS

| 2002/0050451 A1 | 5/2002 | Ford et al. |
| 2009/0246572 A1 | 10/2009 | Dahlberg et al. |
| 2016/0076158 A1 | 3/2016 | Tamura et al. |

FOREIGN PATENT DOCUMENTS

| JP | 2002-113468 | 4/2002 |
| JP | 2009-540130 | 11/2009 |
| JP | 2011-68699 | 4/2011 |
| JP | 2 905 359 A1 | 8/2013 |

(Continued)

*Primary Examiner* — Zulmariam Mendez
(74) *Attorney, Agent, or Firm* — Oblon, McClelland, Maier & Neustadt, L.L.P.

(57) ABSTRACT

An electrochemical reaction device of an embodiment includes: an electrolytic solution tank; a first electrode in the first room; a second electrode in the second room; and a generator. The electrolytic solution tank includes a first room and a second room. The first room is capable of storing a first electrolytic solution containing a first substance including carbon dioxide. The second room is capable of storing a second electrolytic solution containing a second substance. The first electrode reduces the first substance. The second electrode oxidizes the second substance. The generator is electrically connected to the first and second electrodes. The first electrode includes a conductor having a flow path penetrating through the conductor.

17 Claims, 7 Drawing Sheets

(56) References Cited

FOREIGN PATENT DOCUMENTS

| | | |
|---|---|---|
| JP | 2013-253269 | 12/2013 |
| JP | 2013-253270 | 12/2013 |
| JP | 2014-74207 | 4/2014 |
| JP | 2015-59231 | 3/2015 |
| JP | 2015-132012 | 7/2015 |

ELECTROCHEMICAL REACTION DEVICE

CROSS-REFERENCE TO RELATED APPLICATION

This application is based upon and claims the benefit of priority from Japanese Patent Application No. 2016-184084 filed on Sep. 21, 2016; the entire contents of which are incorporated herein by reference.

FIELD

Embodiments described herein generally relate to an electrochemical reaction device.

BACKGROUND

Efficiently reducing $CO_2$ with light energy as in plants has been required from viewpoints of energy problems and environmental problems. Plants use a system called a Z-scheme in which light energy is excited in two stages. In an electrochemical reaction using this system, electrons are gained through the oxidation of water ($H_2O$), and compounds such as cellulose and saccharides are synthesized through the reduction of carbon dioxide ($CO_2$).

As an electrochemical reaction device developed in imitation of the Z scheme of plants, there has been known an artificial photosynthesis device which obtains a potential required for reducing $CO_2$ from visible light. The artificial photosynthesis device is capable of producing oxygen simultaneously with the reduction process and thus is also usable as a life support system in, for example, a space station.

DETAILED DESCRIPTION

An electrochemical reaction device of an embodiment includes: an electrolytic solution tank; a first electrode in the first storage part; a second electrode in the second storage part; and a generator. The electrolytic solution tank includes a first storage part and a second storage part. The first storage part is capable of storing a first electrolytic solution containing a first substance including carbon dioxide. The second storage part is capable of storing a second electrolytic solution containing a second substance. The first electrode reduces the first substance. The second electrode oxidizes the second substance. The generator is electrically connected to the first and second electrodes. The first electrode includes a conductor having a flow path penetrating through the conductor.

Embodiments will be hereinafter described with reference to the drawings. The drawings are schematic, and for example, dimensions such as thickness and width of components may differ from actual dimensions of the components. In the embodiments, substantially the same components are denoted by the same reference signs, and description thereof may be partly omitted.

Figure 1:
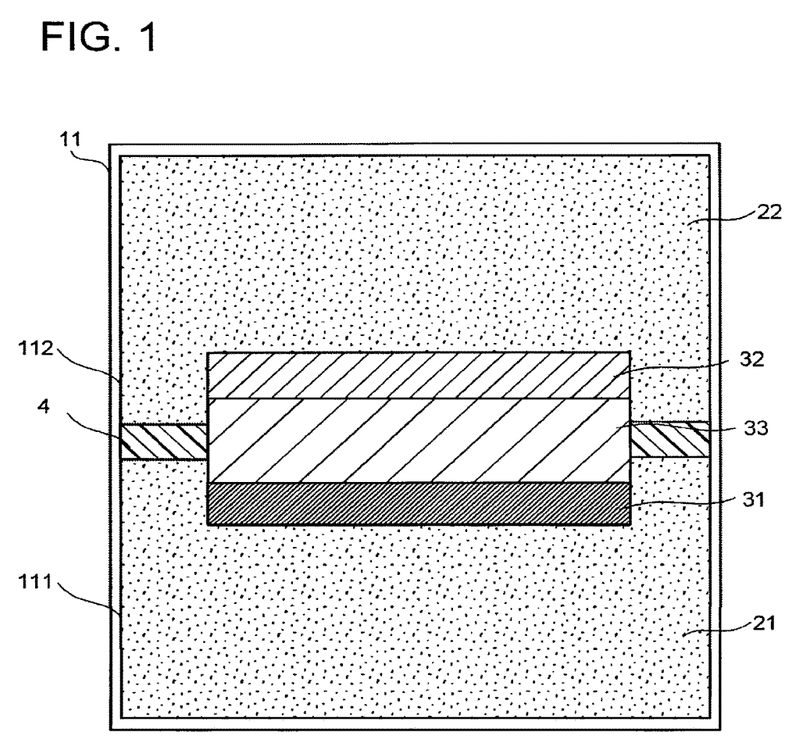
FIG. 1 is a schematic view illustrating a structure example of an electrochemical reaction device.

FIG. 1 is a schematic view illustrating a structure example of an electrochemical reaction device. The electrochemical reaction device illustrated in FIG. 1 includes an electrolytic solution tank 11, an electrode 31, and an electrode 32, a photoelectric conversion layer 33, and an ion exchange membrane 4.

The electrolytic solution tank 11 has a storage part (a first room) 111 and a storage part (a second room) 112. The shape of the electrolytic solution tank 11 may be any three-dimensional shape having a cavity serving as the storage parts. A material of the electrolytic solution tank 11 is a light transmitting material, for instance. The electrochemical reaction device may include a flow path connecting the storage part 111 and the outside of the electrolytic solution tank 11 and a flow path connecting the storage part 112 and the outside of the electrolytic solution tank 11.

The storage part 111 stores an electrolytic solution 21 containing a substance to be reduced (corresponding to a first substance including carbon dioxide). The substance to be reduced is a substance that is reduced through a reduction reaction. Examples of the substance to be reduced include carbon dioxide and hydrogen ions.

The storage part 112 stores an electrolytic solution 22 containing a substance to be oxidized (corresponding to a second substance). The substance to be oxidized is a substance that is oxidized though an oxidation reaction. Examples of the substance to be oxidized include water, an organic matter such as alcohol or amine, and an inorganic oxide such as iron oxide. The electrolytic solution 22 may contain the same substance as that contained in the electrolytic solution 21. In this case, the electrolytic solution 21 and the electrolytic solution 22 may be regarded as one electrolytic solution.

The electrode 31 is a cathode electrode including a reduction catalyst for reducing the substance to be reduced. The electrode 31 is disposed in the storage part 111 and immersed in the electrolytic solution 21.

The reduction catalyst is, for example, a material that lowers activation energy for reducing the hydrogen ions or the carbon dioxide. In other words, this material lowers an overvoltage when hydrogen or a carbon compound is produced through the reduction reaction of the hydrogen ions or the carbon dioxide. As this material, a metal material or a carbon material is usable, for instance. As the metal material, a metal such as platinum or nickel, or an alloy containing the metal is usable in the case of the reduction reaction of the hydrogen ions, for instance. As the metal material, a metal such as gold, aluminum, copper, silver, platinum, palladium, or nickel, or an alloy containing the metal is usable in the case of the reduction reaction of the carbon dioxide. As the carbon material, graphene, carbon nanotube (CNT), fullerene, or ketjen black is usable, for instance. The reduction catalyst is not limited to the above, but may be a metal complex such as a Ru complex or a Re complex, or an organic molecule having an imidazole skeleton or a pyridine skeleton, for instance. The reduction catalyst may also be a mixture of a plurality of materials.

A product of the reduction reaction differs depending on, for example, the kind of the reduction catalyst. The product of the reduction reaction is: a carbon compound such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), and ethylene glycol; or hydrogen, for instance.

Figure 2:
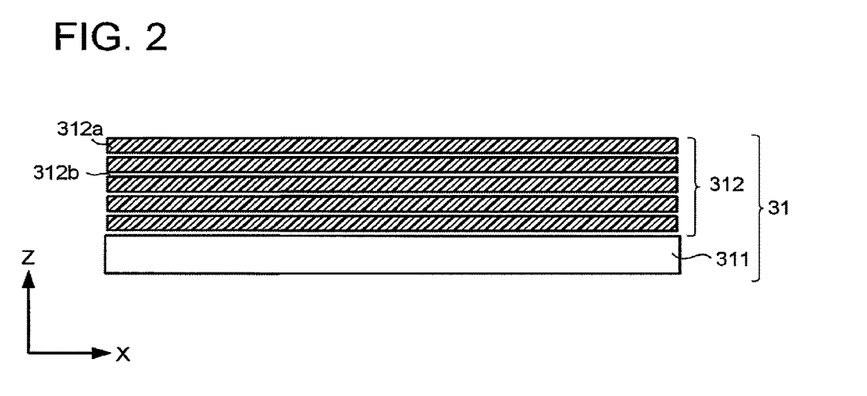
FIG. 2 is a schematic cross-sectional view illustrating a structure example of an electrode.
Figure 3:
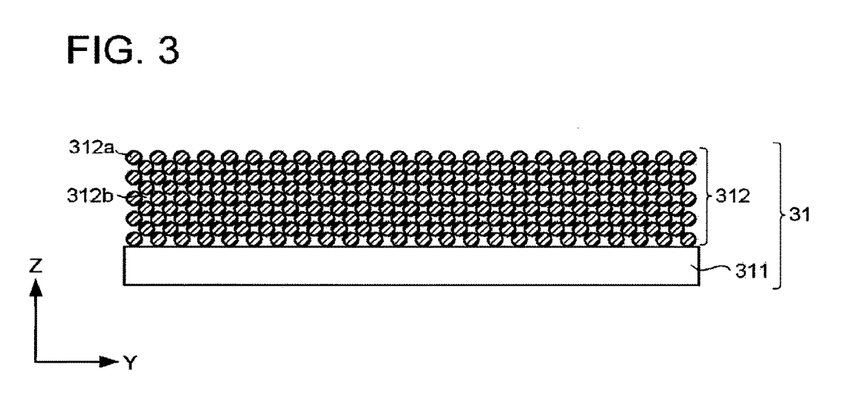
FIG. 3 is a schematic cross-sectional view illustrating the structure example of the electrode.

FIG. 2 and FIG. 3 are schematic cross-sectional views illustrating a structure example of the electrode 31. FIG. 2 is an X-Z cross-sectional view including an X-axis and a Z axis which is perpendicular to the X axis. FIG. 3 is a Y-Z cross-sectional view including the Y-axis which is perpendicular to the X-axis and the Z-axis which is perpendicular to the X-axis and the Y-axis. The X-axis direction is, for example, a width direction of the electrochemical reaction device or a width direction of the electrolytic solution tank 11 and is a flow direction of the electrolytic solution 21 and the electrolytic solution 22. The Y-axis direction is, for example, a depth direction of the electrochemical reaction device or the electrolytic solution tank 11. The Z-axis direction is, for example, a height direction of the electrochemical reaction device or the electrolytic solution tank 11.

The electrode 31 has a conductive layer 311 and a catalyst layer 312 including the reduction catalyst and in contact with the conductive layer 311. As a material of the conductive layer 311, a metal such as silver, gold, aluminum, zinc, palladium, or copper, or an alloy containing at least one of these metals is usable, for instance. As the material of the conductive layer 311, a light transmissive metal oxide such as indium tin oxide (ITO), zinc oxide (ZnO), fluorine-doped tin oxide (FTO), aluminum-doped zinc oxide (AZO), or antimony-doped tin oxide (ATO) is usable, for instance. The conductive layer 311 may have a function as a current collector. The conductive layer 311 does not necessarily have to be provided.

The catalyst layer 312 includes a fluid permeable conductor having conductive members 312a and a gap 312b through which the electrolytic solution 21 can flow in and out. In other words, the gap 312b works as a flow path of the electrolytic solution 21. The fluid permeable conductor may have the reduction catalyst on its surface. In this case, the fluid permeable conductor itself may have the function as the current collector. Alternatively, the fluid permeable conductor itself may be formed of the reduction catalyst. If, for example, a plate electrode having no flow path is used as the electrode 31, the reduction reaction occurs only on a surface of the electrode 31. In addition, in the plate electrode having no flow path, limiting current density is low, and if current density is over the limiting current density, a potential shifts and a production ratio of a by-product increases. The limiting current density is a limit value of the current density (current value per unit area) at or less than which the reduction product can be obtained as a main component. Accordingly, it is necessary to control the current density to not higher than the limiting current density. Further, if the limiting current density is low, a processing rate, which is proportional to the current value, is also low. In addition, continuous processing is structurally difficult.

In the fluid permeable conductor, on the other hand, the area of a region contributing to the reduction reaction in the electrode 31 can be, for example, 1000 times as large as that in the parallel electrode or more owing to the presence of the gap 312b. It is also possible to make the processing rate 1000 times as high as that of a conventional processing rate or more while keeping the current density low. This can increase production efficiency of the reduction product.

The gap 312b penetrates through the fluid permeable conductor. The gap 312b, if not penetrating through the fluid permeable conductor, may obstruct the flow of the electrolytic solution to impede the reduction reaction. The gap 312b penetrating the fluid permeable conductor, on the other hand, allows the passage of the electrolytic solution to enable the continuous reduction reaction.

As the fluid permeable conductor, a fiber structure including conductive fibers as the conductive members 312a is usable, for instance. As the fiber structure, a nonwoven structure including one conductive fiber or more is usable, for instance. The fiber structure has a large surface area and thus is suitable as the fluid permeable conductor.

In the structure illustrated in FIG. 2, the plural conductive members 312a extend along the X-axis direction (direction perpendicular to the thickness direction of the electrode 31) for convenience' sake. The extension direction of the conductive members 312a is not limited to this, but may be random.

As the conductive members 312a, carbon fibers or metal fibers are usable, for instance. The carbon fibers have high flexibility and thus can more easily control the shape of the gap 312b than the metal fibers. As the metal fiber, the material usable as the reduction catalyst may be used, for instance, and the metal fiber preferably contains at least one element selected from gold, silver, platinum, copper, zinc, and nickel.

The fluid permeable conductor is not limited to the fiber structure, but may be a sintered compact including one conductive particle or more as the conductive member 312a, or may be a hollow yarn structure including one conductive hollow yarn or more as the conductive member 312a, for instance. In this case, the conductive members 312a need not extend in the X-axis direction. Pores among the conductive particles and the hollow of the conductive hollow yarn works as flow paths of the electrolytic solution 21 and porous material itself such as the sintered compact and the hollow yarn structure has a fluid permeable property.

The gap 312b is provided between the adjacent conductive members 312a. Accordingly, the size of the gap 312b is controlled according to an interval between the adjacent conductive members 312a. The gap 312b may be provided in plurality. The gaps 312b each may have a three-dimensionally branching structure, and may have a plurality of inlet and outlet ports exposed to the surface of the fluid permeable conductor and allowing the electrolytic solution to flow in and out.

The maximum value of the interval between the adjacent conductive members 312a in the region where the reduction reaction takes place is preferably not less than 0.01 mm nor more than 0.1 mm, for instance. This makes it possible to make the width of the region where the reduction reaction takes place (the interval between the conductive members 312a) equal to or less than the thickness of a diffusion layer formed by the conductive members 312a and inhibit diffusion rate-controlling. This eliminates a need for an agitator for agitating the electrolytic solution 21, for instance. The aforesaid interval is controlled according to the diameter of the conductive members 312a, for instance. This is not restrictive, and the maximum value of an interval between the adjacent conductive particles or the maximum diameter of hollow portions of the conductive hollow yarns may be controlled within the range of not less than 0.01 mm nor more than 0.1 mm, by controlling the particle size of the conductive particles or the diameter of the hollow portions of the conductive hollow yarns.

The electrode 31 may have metal layers in contact with surfaces of the conductive members 312a. The electrode 31 may also have modifier organic molecules bonded to the surfaces of the conductive members 312a or surfaces of the metal layers.

Figure 4:
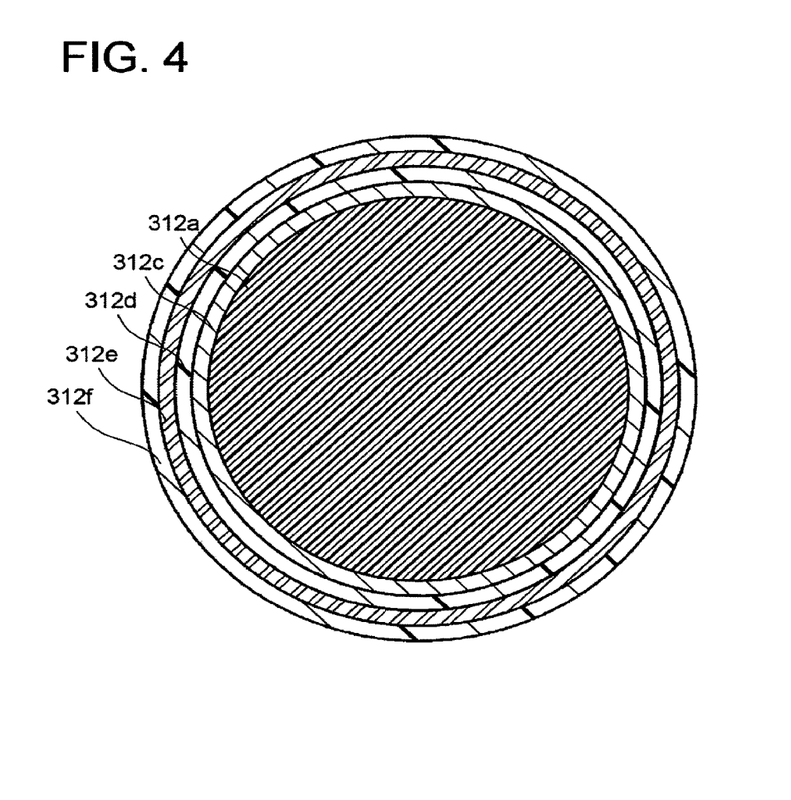
FIG. 4 is a schematic cross-sectional view illustrating another structure example of a conductive member.

FIG. 4 is a schematic view illustrating a structure example of the conductive member 312a bonded to the modifier organic molecules via the metal layer. A metal layer 312c is on the surface of the conductive member 312a illustrated in FIG. 4. An organic molecule layer 312d is on the surface of the metal layer 312c. A metal fine particle part 312e formed of metal fine particles is on a surface of the organic molecule layer 312d. A modifier organic molecule part 312f formed of the modifier organic molecules is on a surface of the metal fine particle part 312e. Where the conductive member 312a is a fiber, particle, or hollow yarn structure, the metal layer 312c, the organic molecule layer 312d, the metal fine particle part 312e, and the modifier organic molecule part 312f may be formed before or after the structure is formed. As methods of forming the metal layer 312c, the organic molecule layer 312d, the metal fine particle part 312e, and the modifier organic molecule part 312f, conventional forming methods may be appropriately usable.

As the metal layer 312c, the material usable as the reduction catalyst is usable, for instance. The material preferably includes at least one element selected from gold, silver, platinum, copper, zinc, and nickel. Alternatively, an oxide such as titanium oxide ($TiO_2$), zirconium oxide ($ZrO_2$), aluminum oxide ($Al_2O_3$), silicon oxide ($SiO_2$), zinc oxide (ZnO), ITO, or FTO may be used as the metal layer 312c.

The organic molecule layer 312d is chemically bonded to the metal layer 312c. The organic molecule layer 312d is a single layer film formed through self-assembly. The organic molecule layer 312d has a function of fixing and electrically connecting the metal fine particles forming the metal fine particle part 312e.

The organic molecule layer 312d has long-chain alkyl groups, first reactive functional groups, and second reactive functional groups, for instance. The longer the alkyl chain length of the long-chain alkyl groups, a molecule layer denser and having more aligned orientation can be obtained around the conductive member 312a. Accordingly, increasing the alkyl chain length of the long-chain alkyl groups improves fixability of the metal fine particles forming the metal fine particle part 312e and durability of the organic molecule layer 312d. If the alkyl chain length of the long-chain alkyl groups is too long, the resistance of a tunnel current in the organic molecule layer 312d increases, resulting in an increased electrode resistance. Therefore, a carbon number of the long-chain alkyl groups is preferably 2 to 16.

The first reactive functional groups are each formed at one end of the long-chain alkyl group. The first reactive functional groups have affinity to the conductive member 312a or the metal layer 312c, and chemically react with the conductive member 312a or the metal layer 312c to be bonded thereto. Where the conductive member 312a or the metal layer 312c is formed of a metal material, the first reactive functional groups are each preferably a functional group capable of covalent bonding, such as a thiol group, a disulfide group, or a thiocyanate group. Among them, the thiol group, which is excellent in bonding strength, is more preferable. On the other hand, where the metal layer 312c is formed of, for example, an oxide layer, the first reactive functional group is preferably a functional group capable of covalent bonding, such as a carboxylic acid group, a phosphonic acid group, a phosphoric ester group, or an alkoxysilyl group. Among them, the phosphonic acid group, which is excellent in bonding strength, is more preferable.

The second reactive functional groups are formed at the other ends of the long-chain alkyl groups. The second reactive functional groups have affinity to the metal fine particles forming the metal fine particle part 312e, and chemically react with the metal fine particles to be bonded thereto. Consequently, the second reactive functional groups fix the metal fine particles to the surface of the organic molecule layer 312d. The second reactive functional groups are each preferably a functional group capable of covalent bonding, such as a thiol group, a disulfide group, or a thiocyanate group. Among them, the thiol group, which is excellent in bonding strength, is more preferable.

The metal fine particles forming the metal fine particle part 312e are chemically bonded to the surface of the organic molecule layer 312d (the second reactive functional groups). The metal fine particles are electrically charged by including the organic molecules (the reactive functional groups) having electric charges on part of their surfaces. The electric charges on surfaces of the metal fine particles cause electrostatic repulsion between the particles to prevent the fine particles having a nanoparticle size from aggregating and becoming coarse.

The metal fine particles can be fixed on the surface of the organic molecule layer 312d by electrostatic attraction (electrostatic bond), using the electric charges on the surfaces of the metal fine particles and the electric charges on the second reactive functional groups in the organic molecule layer 312d. More specifically, where negative electric charges of carboxyl groups are present on the surfaces of the metal fine particles, it is possible to fix the metal fine particles by selecting amino groups or quaternary nitrogen cations as the second reactive functional groups in the organic molecule layer 312d. On the other hand, where positive electric charges of amino groups or quaternary nitrogen cations are present on the surfaces of the metal fine particles, it is possible to fix the metal fine particles by selecting carboxyl groups as the second reactive functional groups.

The surfaces of the metal fine particles can be electrically charged using organic molecules stemming from a method of manufacturing the metal fine particles or can be electrically charged using organic molecules stemming from processes after the manufacture. For example, if a reducing agent such as citric acid is used when the metal fine particles are reduced and precipitated from a liquid layer, the surfaces of the metal fine particles are given the citric acid to be negatively charged. Then, when molecules having amino groups are electrostatically bonded to the surfaces of the negatively charged metal fine particles, the surfaces of the metal fine particles are positively charged. Alternatively, when amine molecules having covalent bondable reactive groups such as thiol are made to react with the surfaces of the metal fine particles, the surfaces of the metal fine particles are also positively charged. That is, the amine molecules having the covalent bondable reactive groups such as thiol are usable irrespective of whether the electric charges are present or absent on the surfaces of the metal fine particles or irrespective of whether the electric charges are positive or negative.

The metal fine particles serve as the reduction catalyst which activates the reduction reaction, and preferably include at least one element selected from gold, silver, platinum, copper, zinc, and nickel.

The metal fine particles that are nano-fine particles have high catalytic activity. Accordingly, the average particle size of the metal fine particles is preferably 300 nm or less, for instance. This is because activation efficiency of the metal fine particles whose average particle size is over 300 nm is very low.

The average particle size of the metal fine particles is more preferably not less than 1 nm nor more than 150 nm. This upper limit is decided in consideration of the aforesaid activity. The lower limit is decided in consideration of difficulty of a process of manufacturing the fine particles. That is, when the average particle size of the metal fine particles is less than 0.5 nm, it is difficult to control the process of manufacturing the fine particles, resulting in an increased manufacturing cost of the fine particles.

As the metal fine particles, fine particles with a 50 nm average particle size or less may be used alone, or aggregates (secondary particles) of primary particles of these fine particles may be used.

The modifier organic molecules forming the modifier organic molecule part 312$f$ are chemically bonded to the surfaces of the metal fine particles. The modifier organic molecules each have a reactive functional group, a long-chain alkyl group, and a quaternary nitrogen cation.

The reactive functional groups of the modifier organic molecule part 312$f$ are each formed at one end of the long-chain alkyl group of the modifier organic molecule part 312$f$. The reactive functional groups, which have affinity to the metal fine particles, chemically react with the metal fine particles to be bonded thereto. Consequently, the reactive functional groups fix the modifier organic molecules to the surfaces of the metal fine particles. The reactive functional group is preferably a functional group capable of covalent bonding, such as a thiol group, a disulfide group, or a thiocyanate group. Among them, the thiol group is excellent in bonding strength and thus is more preferable.

The quaternary nitrogen cations are formed at the other ends of the long-chain alkyl groups of the modifier organic molecule part 312$f$. The quaternary nitrogen cations have a function of promoting the reduction reaction caused by the metal fine particles.

In an elementary reaction of the $CO_2$ reduction reaction, $CO_2$ becomes a $CO_2$ radical anion through a reduction reaction of one electron. This reaction requires a high overvoltage. This overvoltage is a loss of energy and causes deterioration of energy conversion efficiency. Along with the $CO_2$ reduction reaction, a reduction reaction of water or hydrogen ions also occurs as a side reaction, so that hydrogen is produced. The side reaction lowers Faraday's efficiency of the $CO_2$ reduction reaction.

On the other hand, the quaternary nitrogen cations on the surfaces of the metal fine particles form reactive intermediates with $CO_2$. Accordingly, the quaternary nitrogen cations have an effect of contributing to the production and stabilization of the $CO_2$ radical anions, making it possible to cause the $CO_2$ reduction reaction with low energy. As a result, the energy conversion efficiency can be enhanced. Further, being fixed to the surfaces of the metal fine particles, the quaternary nitrogen cations have an effect of preventing the water or the hydrogen ions from approaching the metal fine particles. That is, the quaternary nitrogen cations can impart reaction selectivity to the metal fine particles. This makes it possible to reduce the hydrogen produced by the side reaction to improve the Faraday's efficiency.

With the metal fine particles bonded to the quaternary nitrogen cations, the reduction product changes depending on the interaction of the quaternary nitrogen cations, the metal fine particles, and $CO_2$. Specifically, $CO_2$ is converted to carbon monoxide (CO), formic acid (HCOOH), formaldehyde (HCHO), and methanol ($CH_3OH$). Further, $CO_2$ is sometimes converted to acetic acid ($CH_3COOH$), acetaldehyde ($CH_3CHO$), and ethanol ($CH_3CH_2OH$).

The quaternary nitrogen cations are preferably ammonium cations, imidazole cations, pyridinium cations, piperidinium cations, or pyrrolidinium cations, for instance. Among them, the imidazole cations excellently improves the activity of the $CO_2$ reduction and thus are preferable.

In the structure of the modifier organic molecules, the quaternary nitrogen cations and the reactive functional groups of the modifier organic molecule part 312$f$ bonded to the surfaces of the metal fine particles may be coupled via the long-chain alkyl groups or may be directly coupled. Where the quaternary nitrogen cations and the reactive functional groups are coupled via the long-chain alkyl groups, greatly increasing the alkyl chain length makes it difficult for the quaternary nitrogen cations to be involved in the $CO_2$ reduction reaction caused by the metal fine particles. Accordingly, the alkyl chain length of the long-chain alkyl groups is preferably 2 to 16 in terms of carbon number.

Examples of the organic molecules forming the modifier organic molecules include 15-carboxy-1-pentadecanethiol, 10-carboxy-1-decanethiol, 7-carboxy-1-heptanethiol, 5-carboxy-1-pentanethiol, 3-carboxy-1-propanethiol, mercaptoacetic acid, 10-carboxydecyl-disulfide, 7-carboxyheptyl-disulfide, 5-carboxypentyl-disulfide, 4,4'-dithiodibutanoic acid, 16-amino-1-hexadecanethiol, 11-amino-1-undecanethiol, 8-amino-1-octanethiol, 6-amino-1-hexanethiol, 11-mercaptoundecan-1-trimethylammonium chloride, 11-mercaptoundecan-1-sodium sulfonate, 11-mercaptoundecan-1-phosphonic acid, 1-(2-mercaptoethyl)-3-methylimidazolium bromide, 1-(2-mercaptoethyl)-3-methylimidazolium bromide, 1-(3-mercaptopropyl)-3-methylimidazolium bromide, 1-(4-mercaptobutyl)-3-methylimidazolium bromide, 1-(4-mercaptobutyl)-3-methylimidazolium bromide, 1-(5-mercaptopentyl)-3-methylimidazolium bromide, 1-(6-mercaptohexyl)-3-methylimidazolium bromide, 1-(8-mercaptooctyl)-3-methylimidazolium bromide, 1-(9-mercaptononyl)-3-methylimidazolium bromide, 1-(10-mercaptodecyl)-3-methylimidazolium bromide, 1-(11-mercaptoundecyl)-3-methylimidazolium bromide, 1-(12-mercaptododecyl)-3-methylimidazolium bromide, 1-(2-mercaptoethyl)-3-ethylimidazolium bromide, 1-(4-mercaptobutyl)-2,3-dimethylimidazolium bromide, 1-(2-mercaptoethyl)-4-methylpyridinium bromide, 1-(3-mercaptopropyl)-4-methylpyridinium bromide, 1-(4-mercaptobutyl)-4-methylpyridinium bromide, 1-(5-mercaptopentyl)-4-methylpyridinium bromide, 1-(6-mercaptohexyl)-4-methylpyridinium bromide, 1-(8-mercaptooctyl)-4-methylpyridinium bromide, 1-(9-mercaptononyl)-4-methylpyridinium bromide, 1-(10-mercaptodecyl)-4-methylpyridinium bromide, 1-(11-mercaptoundecyl)-4-methylpyridinium bromide, 1-(12-mercaptododecyl)-4-methylpyridinium bromide, 1-(4-mercaptobutyl)pyridinium bromide, 1-(2-mercaptoethyl)-1-methylpyrrolidinium bromide, 1-(3-mercaptopropyl)-1-methylpyrrolidinium bromide, 1-(4-mercaptobutyl)-1-methylpyrrolidinium bromide, 1-(5-mercaptopentyl)-1-methylpyrrolidinium bromide, 1-(6-mercaptohexyl)-1-methylpyrrolidinium bromide, 1-(8-mercaptooctyl)-1-methylpyrrolidinium bromide, 1-(9-mercaptononyl)-1-methylpyrrolidinium bromide, 1-(10-mercaptodecyl)-1- methylpyrrolidinium bromide, 1-(11-mercaptoundecyl)-1-methylpyrrolidinium bromide, 1-(12-mercaptododecyl)-1-methylpyrrolidinium bromide, 1-(2-mercaptoethyl)-1-methylpiperidinium bromide, 1-(3-mercaptopropyl)-1-methylpiperidinium bromide, 1-(4-mercaptobutyl)-1-methylpiperidinium bromide, 1-(5-mercaptopentyl)-1-methylpiperidinium bromide, 1-(6-mercaptohexyl)-1-methylpiperidinium bromide, 1-(8-mercaptooctyl)-1-methylpiperidinium bromide, 1-(9-mercaptononyl)-1-methylpiperidinium bromide, 1-(10-mercaptodecyl)-1-methylpiperidinium bromide, 1-(11-mercaptoundecyl)-1-methylpiperidinium bromide, 1-(12-mercaptodecyl)-1-methylpiperidinium bromide, 1,2-ethanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,11-undecanedithiol, 1,12-dodecanedithiol, 1,13-tridecanedithiol, 1,14-tetradecanedithiol, 1,15-pentadecanedithiol, and 1,16-hexadecanedithiol.

The amine may form a salt of, for example, hydrofluoric acid, hydrochloric acid, oxalic acid, iodic acid, sulfuric acid, nitric acid, or phosphoric acid. Further, counter anions of the quaternary nitrogen cations such as ammonium salts, imidazolium salts, pyridinium salts, pyrrolidinium salts, or piperidinium salts may be, for example, fluoride ions, chloride ions, bromide ions, iodide ions, $HCO_3^-$, $BF_4^-$, $PF_6^-$, $CF_3COO^-$, $CF_3SO_3^-$, $NO_3^-$, $SCN^-$, $N(CN)_2^-$, $C(CN)_3^-$ $(CF_3SO_2)_3C^-$, bis(trifluoromethoxysulfonyl)imide anions, bis(trifluoromethoxysulfonyl)imide anions, or bis(perfluoroethylsulfonyl)imide anions.

The electrode 32 is an anode electrode including an oxidation catalyst for oxidizing the substance to be oxidized. The electrode 32 is disposed in the storage part 112 and is immersed in the electrolytic solution 22. The electrode 32 may extend along, for example, the X-axis direction. A product of the oxidation reaction differs depending on, for example, the kind of the oxidation catalyst. Hydrogen ions, for instance, are produced by the oxidation reaction.

An example of the oxidation catalyst is a material that lowers activation energy for oxidizing the water. In other words, this material lowers an overvoltage when oxygen and hydrogen ions are produced through the oxidation reaction of the water. For example, this material is iridium, iron, platinum, cobalt, or manganese. Alternatively, a binary metal oxide, a ternary metal oxide, or a quaternary metal oxide is usable as the oxidation catalyst, for instance. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), and ruthenium oxide (Ru—O). Examples of the ternary metal oxide include Ni—Co—O, La—Co—O, Ni—La—O, and Sr—Fe—O. Examples of the quaternary metal oxide include Pb—Ru—Ir—O and La—Sr—Co—O. The oxidation catalyst is not limited to the above, and may be a metal complex such as a Ru complex or a Fe complex. The oxidation catalyst may be a mixture of a plurality of materials.

The photoelectric conversion layer 33 has a first surface electrically connected to the electrode 31 and a second surface electrically connected to the electrode 32. In FIG. 1, the electrode 31, the electrode 32, and the photoelectric conversion layer 33 are stacked. The electrode 31 is in contact with the first surface of the photoelectric conversion layer 33, and the electrode 32 is in contact with the second surface of the photoelectric conversion layer 33. In this case, a stack including the electrode 31, the electrode 32, and the photoelectric conversion layer 33 is called an electrochemical reaction cell. The electrochemical reaction cell penetrates through the ion exchange membrane 4 and is immersed in the electrolytic solution 21 and the electrolytic solution 22. The photoelectric conversion layer 33 has a function as a generator.

The photoelectric conversion layer 33 has a function of separating charges using energy of irradiating light such as sunlight. Electrons and holes generated as a result of the charge separation migrate toward the conductive layer and toward the oxidation electrode layer respectively. Consequently, the photoelectric conversion layer 33 can generate an electromotive force. As the photoelectric conversion layer 33, a pn-junction or pin junction photoelectric conversion layer is usable, for instance. The photoelectric conversion layer 33 may be fixed to, for example, the electrolytic solution tank 11. The photoelectric conversion layer 33 may be a stack of a plurality of photoelectric conversion bodies. The electrode 31, the electrode 32, and the photoelectric conversion layer 33 may be different in size.

The ion exchange membrane 4 separates the storage part 111 and the storage part 112 from each other. The ion exchange membrane 4 allows specific ions to pass therethrough. Where the electrochemical reaction device has a flow path connecting the storage part 111 and the storage part 112, the flow path may be divided by the ion exchange membrane 4.

Figure 5:
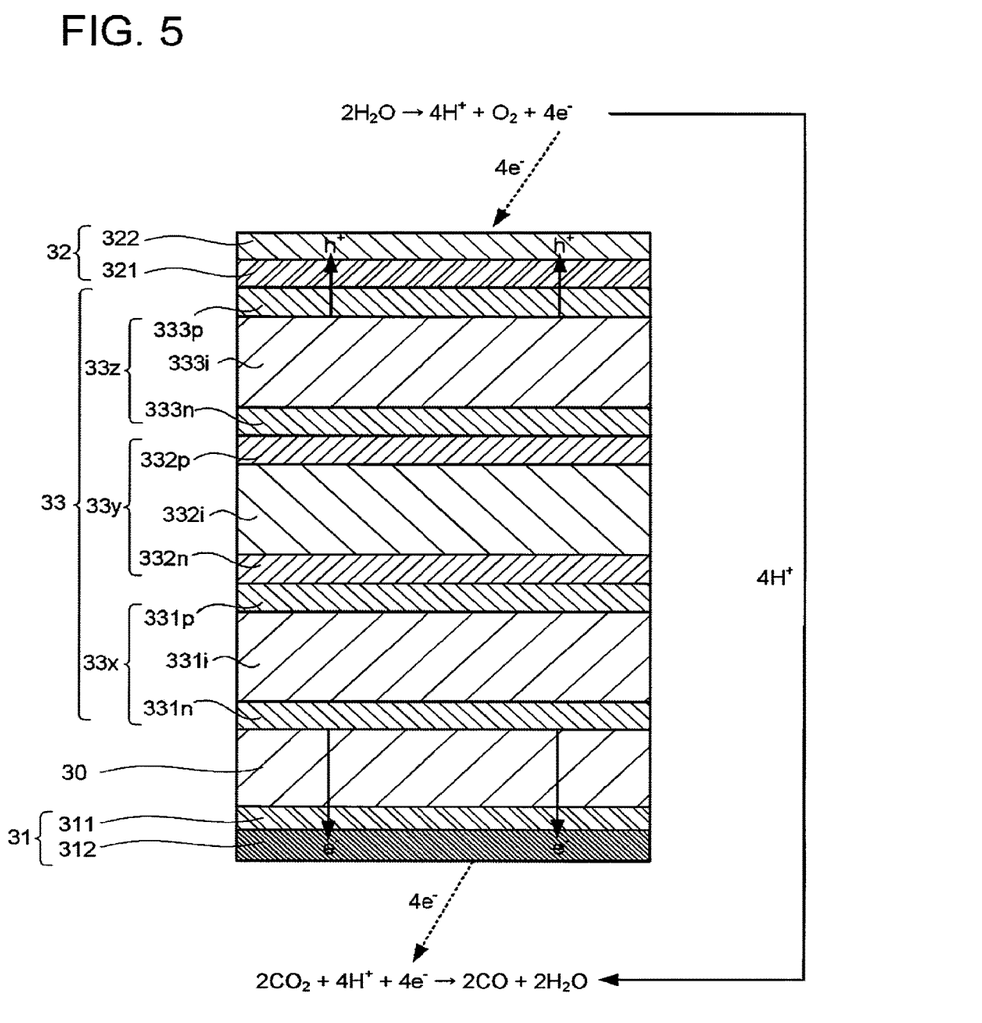
FIG. 5 is a schematic explanatory view of an operation example of the electrochemical reaction device.

FIG. 5 is a schematic explanatory view of an operation example of the electrochemical reaction device illustrated in FIG. 1. The electrode 32 illustrated in FIG. 5 has a conductive layer 321 and a catalyst layer 332 including a fluid permeable conductor. As a material of the conductive layer 321, the material usable for the conductive layer 311 is usable, for instance. The conductive layer 321 does not necessarily have to be provided.

The catalyst layer 322 may include the fluid permeable conductor usable in the electrode 31, for instance. The use of the fluid permeable conductor can enhance production efficiency of the oxidation product as can enhance that of the reduction product. Where the electrode 32 oxidizes water to produce oxygen, there is no restriction by the diffusion rate-controlling, and thus the electrode 32 need not include the fluid permeable conductor.

Where a metal material is used for conductive members or the like in the electrode 32, the metal material sometimes includes a material usable as the oxidation catalyst instead of the material usable as the reduction catalyst. The other description of the electrode 32 can be appropriately assisted by the description of the electrode 31.

The photoelectric conversion layer 33 illustrated in FIG. 5 has a stacked structure of a photoelectric conversion layer 33x, a photoelectric conversion layer 33y, and a photoelectric conversion layer 33z. The number of the stacked photoelectric conversion bodies is not limited to that in FIG. 1.

The photoelectric conversion layer 33x has a stacked structure of, for example, an n-type semiconductor layer 331n containing n-type amorphous silicon, an i-type semiconductor layer 331i containing intrinsic amorphous silicon germanium, and a p-type semiconductor layer 331p containing p-type microcrystalline silicon. The i-type semiconductor layer 331i is a layer that absorbs light in a short wavelength region including 400 nm, for instance. Accordingly, in the photoelectric conversion layer 33x, charge separation is caused by energy of the light in the short wavelength region.

The photoelectric conversion layer 33y has a stacked structure of, for example, an n-type semiconductor layer 332n containing n-type amorphous silicon, an i-type semiconductor layer 332i containing intrinsic amorphous silicon germanium, and a p-type semiconductor layer 332p containing p-type microcrystalline silicon. The i-type semiconductor layer 332i is a layer that absorbs light in a middle wavelength region including 600 nm, for instance. Accordingly, in the photoelectric conversion layer 33y, charge separation is caused by energy of the light in the middle wavelength region.

The photoelectric conversion layer 33z has a stacked structure of, for example, an n-type semiconductor layer 333n containing n-type amorphous silicon, an i-type semiconductor layer 333i containing intrinsic amorphous silicon, and a p-type semiconductor layer 333p containing p-type microcrystalline silicon. The i-type semiconductor layer 333i is a layer that absorbs light in a long wavelength region including 700 nm, for instance. Accordingly, in the photoelectric conversion layer 33z, charge separation is caused by energy of the light in the long wavelength region.

It is possible to form the p-type semiconductor layer or the n-type semiconductor layer by, for example, adding an element serving as a donor or an acceptor to a semiconductor material. In the photoelectric conversion layer 33, semiconductor layers containing silicon and/or germanium are used as the semiconductor layers, but this is not restrictive. For example, compound semiconductor layers are usable. As the compound semiconductor layer, a semiconductor layer containing GaAs, GaInP, AlGaInP, CdTe, or CuInGaSe is usable, for instance. A layer containing a material such as $TiO_2$ or $WO_3$ may also be used if this material is capable of photoelectric conversion. The semiconductor layers each may be monocrystalline, polycrystalline, or amorphous. The photoelectric conversion layer may include a zinc oxide layer.

The electrochemical reaction device may have a conductive substrate 30 between the electrode 31 and the photoelectric conversion layer 33. The conductive substrate 30 has a function of supporting the electrode 31, the electrode 32, and the photoelectric conversion layer 33, for instance. Examples of the conductive substrate 30 include a substrate containing at least one element or a plurality of elements out of Cu, Al, Ti, Ni, Fe, and Ag. For example, a stainless steel substrate containing stainless steel such as SUS may be used. The conductive substrate 30 is not limited to the above and may be formed of conductive resin. Alternatively, the conductive substrate 30 may be formed using a semiconductor substrate of Si or Ge, for instance. Further, a resin film or the like may be used as the conductive substrate 30. For example, a film usable as the ion exchange membrane 4 may be used as the conductive substrate 30. The conductive substrate 30 may be provided instead of the conductive layer 311. Further, the conductive substrate 30 may be disposed instead of the ion exchange membrane 4 to separate the storage part 111 and the storage part 112 from each other.

The electrochemical reaction device may have a light reflection layer between the photoelectric conversion layer 33 and the conductive substrate 30. An example of the light reflection layer is a distributed Bragg reflection layer formed of a stack of metal layers or semiconductor layers. Owing to the presence of the light reflection layer, light that cannot be absorbed by the photoelectric conversion layer 33 can be reflected to enter one of the photoelectric conversion layer 33x to the photoelectric conversion layer 33z, which can enhance conversion efficiency from the light to chemical substances. As the light reflection layer, a layer of a metal such as Ag, Au, Al, or Cu or an alloy containing at least one of these metals is usable, for instance.

The catalyst layer 312 is in contact with the electrolytic solution 21. As the electrolytic solution 21, an aqueous solution containing $LiHCO_3$, $NaHCO_3$, $KHCO_3$, $CsHCO_3$, phosphoric acid, or boric acid may be used, for instance. The electrolytic solution 21 may include any of alcohols such as methanol, ethanol, and acetone. The electrolytic solution 21 and the electrolytic solution 22 may be the same.

As the electrolytic solution 21, usable is, for example, an ionic liquid that is made of a salt of cations such as imidazolium ions or pyridinium ions and anions such as $BF_4^-$ or $PF_6^-$ and that is in a liquid state in a wide temperature range, or an aqueous solution thereof. Other examples of the electrolytic solution include amine solutions of ethanolamine, imidazole, and pyridine, and aqueous solutions thereof. Examples of the amine include primary amine, secondary amine, and tertiary amine. These electrolytic solutions may have high ion conductivity, have a property of absorbing carbon dioxide, and have characteristics of decreasing reduction energy.

Examples of the primary amine include methylamine, ethylamine, propylamine, butylamine, pentylamine, and hexylamine. A hydrocarbon of the amine may be replaced with, for example, alcohol or halogen. Examples of the amine whose hydrocarbon is replaced include methanolamine, ethanolamine, and chloromethyl amine. Further, an unsaturated bond may exist. The same applies to hydrocarbons of the secondary amine and the tertiary amine.

Examples of the secondary amine include dimethylamine, diethylamine, dipropylamine, dibutylamine, dipentylamine, dihexylamine, dimethanolamine, diethanolamine, and dipropanolamine. The replaced hydrocarbons may be different. The same applies to the tertiary amine. Examples of amine in which replaced hydrocarbons are different include methylethylamine and methylpropylamine.

Examples of the tertiary amine include trimethylamine, triethylamine, tripropylamine, tributylamine, trihexylamine, trimethanolamine, triethanolamine, tripropanolamine, tributanolamine, triexanolamine, methyldiethylamine, and methyldipropylamine.

Examples of the cations of the ionic liquid include 1-ethyl-3-methylimidazolium ions, 1-methyl-3-propylimidazolium ions, 1-butyl-3-methylimidazole ions, 1-methyl-3-pentylimidazolium ions, and 1-hexyl-3-methylimidazolium ions.

The positions 2 of the imidazolium ions may be replaced. Examples of the cations in which the positions 2 of the imidazolium ions are replaced include 1-ethyl-2,3-dimethylimidazolium ions, 1,2-dimethyl-3-propylimidazolium ions, 1-butyl-2,3-dimethylimidazolium ions, 1,2-dimethyl-3-pentylimidazolium ions, and 1-hexyl-2,3-dimethylimidazolium ions.

Examples of the pyridinium ions include methylpyridinium ions, ethylpyridinium ions, propylpyridinium ions, butylpyridinium ions, pentylpyridinium ions, and hexylpyridinium ions. In the imidazolium ion and the pyridinium ion, an alkyl group may be replaced, and an unsaturated bond may exist.

Examples of the anions include fluoride ions, chloride ions, bromide ions, iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, and bis(perfluoroethylsulfonyl)imide. Dipolar ions in which the cations and the anions of the ionic liquid are coupled by hydrocarbons may be used. A buffer solution such as a potassium phosphate solution may be supplied to the storage parts 111, 112.

As the electrolytic solution 21, toluene, benzene, octane, octanol, dimethylformamide, hexane, xylene, chlorobenzene, ethyl acetate, chloroethylene, dichloroethylene, acetic acid, formalin, formic acid, acetaldehyde, tetrahydrofuran, cyclohexane, methanol, ethanol, ethylene glycol, glyoxal, acetonitrile, methyl acetate, ethyl methyl ketone, dimethyl ether, acetone, diethyl ether, chloroform, methylene chloride, dimethyl sulfoxide (DMSO), or dimethyl disulfide (DMDS) is usable, or hexamethylphosphoric triamide (HMPA) or N,N'-dimethylpropyleneurea (DMPU), which is an aprotic solvent, is usable. These are each can be used alone or a mixture of these can be used.

The catalyst layer 322 is in contact with the electrolytic solution 22. As the electrolytic solution 22, an aqueous solution containing an optional electrolyte is usable, for instance. Examples of the aqueous solution containing the electrolyte include aqueous solutions containing phosphoric acid ion ($PO_4^{2-}$), boric acid ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), and hydrogen carbonate ions ($HCO_3^-$). Where the electrolytic solution 22 contains carbon dioxide, the electrolytic solution usable as the electrolytic solution 21 may be used.

When light enters the photoelectric conversion layer 33, the photoelectric conversion layer 33 generates photoexcited electrons ($e^-$) and holes ($h^-$). At this time, the photoexcited electrons gather to the electrode 31, and the holes gather to the electrode 32. Consequently, the electromotive force is generated in the photoelectric conversion layer 33. The light is preferably the sunlight. The sunlight enters the photoelectric conversion layer 33 through, for example, the electrode 32.

The following describes a case where electrolytic solutions containing water and carbon dioxide are used as the electrolytic solution 21 and the electrolytic solution 22 and carbon monoxide is generated. Around the electrode 32, the water undergoes the oxidation reaction to lose electrons, so that oxygen and hydrogen ions are produced as expressed by the following expression (1). At least one of the produced hydrogen ions migrates to the storage part 111 through the ion exchange membrane 4.

$$2H_2O \rightarrow 4H^+ + O_2 + 4e^- \qquad (1)$$

Around the electrode 31, the reduction reaction of the carbon dioxide occurs, and the hydrogen ions react with the carbon dioxide while receiving the electrons, so that carbon monoxide and water are generated, as expressed by the following expression (2).

$$2CO_2 + 4H^+ + 4e^- \rightarrow 2CO + 2H_2O \qquad (2)$$

The structure example of the electrochemical reaction device is not limited to the structure described with reference to FIG. 1 to FIG. 5. Other structure examples of the electrochemical reaction device will be described with reference to FIG. 6 to FIG. 12. In the other structure examples of the electrochemical reaction device, the same parts as those of the structure of the electrochemical reaction device described with reference to FIG. 1 to FIG. 5 can be appropriately assisted by the description of FIG. 1 to FIG. 5.

Figure 6:
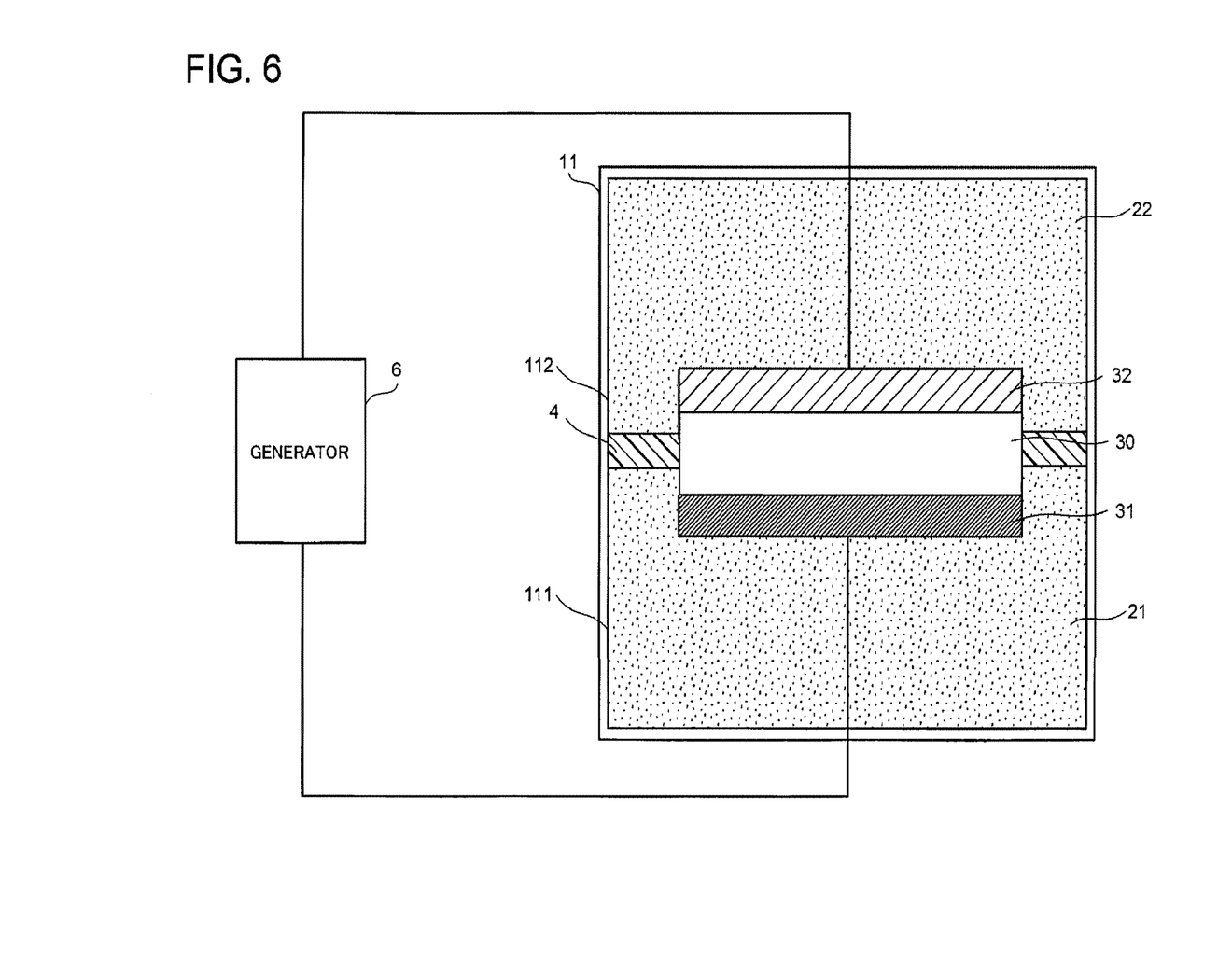
FIG. 6 is a schematic view illustrating another structure example of the electrochemical reaction device.

FIG. 6 is a schematic view illustrating another structure example of the electrochemical reaction device. The electrochemical reaction device illustrated in FIG. 6 is different from the electrochemical reaction device illustrated in FIG. 1 at least in that the electrochemical reaction device illustrated in FIG. 6 does not include the photoelectric conversion layer 33, its electrode 31 and electrode 32 are electrically connected to a generator 6 provided outside the electrolytic solution tank 11, and its conductive substrate 30 is in contact with the electrode 31 and the electrode 32.

The generator 6 is, for example, a power supply such as a photoelectric conversion layer, a system power supply, or a storage battery, or renewable energy such as wind power, water power, or geothermal power. For the connection between the generator 6 and the electrode 31 and for the connection between the generator 6 and the electrode 32, conductive members such as electric wires are used, for instance. The use of the electric wires or the like for the connection of the generator 6 with the electrode 31 and the electrode 32 is advantageous as the system because the constituent elements are separated by function.

Figure 7:
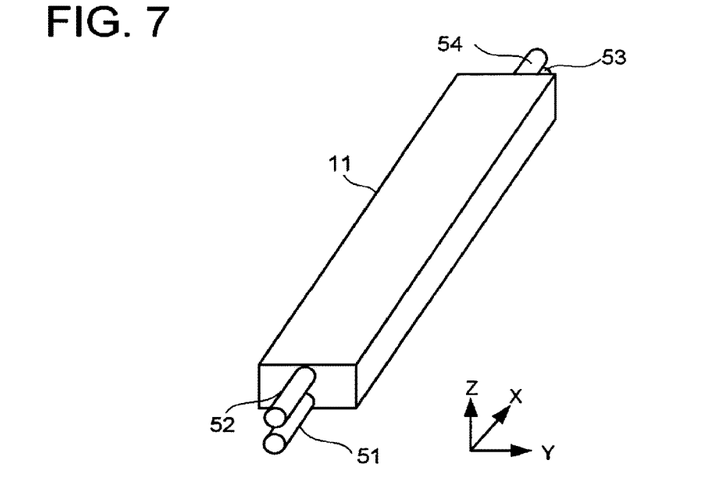
FIG. 7 is a schematic view illustrating another structure example of the electrochemical reaction device.

FIG. 7 is a schematic view illustrating another structure example of the electrochemical reaction device. The electrochemical reaction device illustrated in FIG. 7 includes a channel 51 to a channel 54 in addition to the structure of the electrochemical reaction device illustrated in FIG. 1 or FIG. 6. The planar size of the electrochemical reaction device may be 1 m (Y axis)×11.1 m (X axis), for instance.

The channel 51 and the channel 53 connect the storage part 111 and the outside of the electrolytic solution tank 11 along the X-axis direction, and the channel 52 and the channel 54 connect the storage part 112 and the outside of the electrolytic solution tank 11 along the X-axis direction. The channel 51 is a flow path for supplying the electrolytic solution to the storage part 111, for instance. The channel 52 is a flow path for supplying the electrolytic solution to the storage part 112, for instance. Where the same electrolytic solution is supplied to the storage part 111 and the storage part 112, the number of the channels may be one. The channel 53 is, for example, a flow path not only for the flow-out of the electrolytic solution 21 but also for the recovery of a product produced by the reduction reaction. The channel 54 is, for example, a flow path not only for the flow-out of the electrolytic solution 22 but also for the recovery of a product produced by the oxidation reaction.

Figure 8:
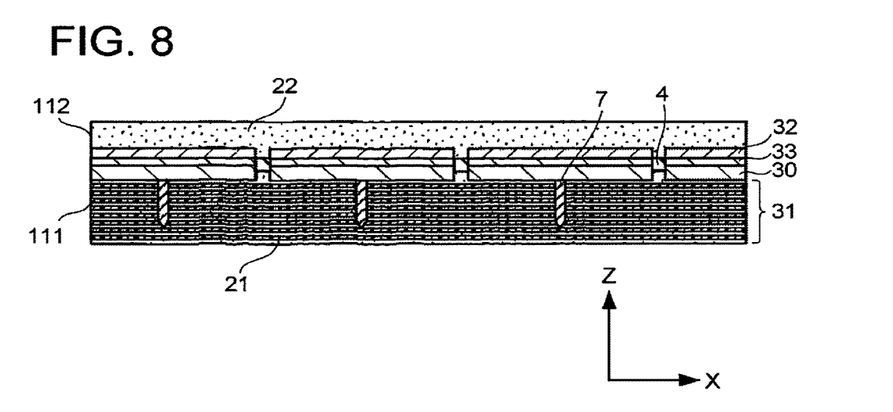
FIG. 8 is a schematic view illustrating the other structure example of the electrochemical reaction device.
Figure 9:
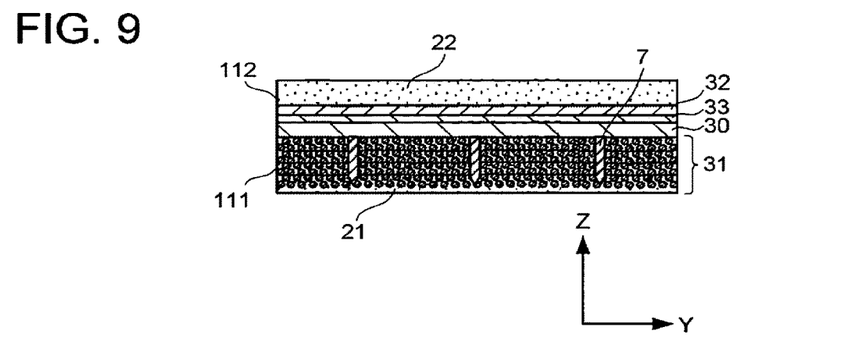
FIG. 9 is a schematic view illustrating the other structure example of the electrochemical reaction device.

FIG. 8 is a schematic X-Z cross-sectional view of the electrochemical reaction device illustrated in FIG. 7. FIG. 9 is a schematic Y-Z cross-sectional view of the electrochemical reaction device illustrated in FIG. 7. The electrochemical reaction device further includes a plurality of conductive substrates 30, one electrode 31, a plurality of electrodes 32, a plurality of photoelectric conversion bodies 33, and current-carrying members 7 in addition to the structure of the electrochemical reaction device described with reference to FIG. 1 to FIG. 5. The electrolytic solutions are supplied to the storage part 111 and the storage part 112 in the X-axis direction.

The plural conductive substrates 30 are arranged along the X-axis direction in the storage part 111. The plural electrodes 32 are arranged along the X-axis direction on the corresponding conductive substrates 30 respectively. The plural photoelectric conversion bodies 33 are arranged along the X-axis direction in the storage part 111.

The fluid permeable conductor of the electrode 31 overlies the plural electrodes 32.

The current-carrying members 7 are provided to fix the fluid permeable conductor and increase conductivity of the fluid permeable conductor. For example, it is preferable to form the current-carrying members 7 on the photoelectric conversion bodies 33, for example, before forming the electrode 31, and then form the fluid permeable conductor penetrating through the current-carrying members 7. As a material of the current-carrying members 7, a material having higher conductivity than that of the conductive members forming the fluid permeable conductor is preferably used.

Figure 10:
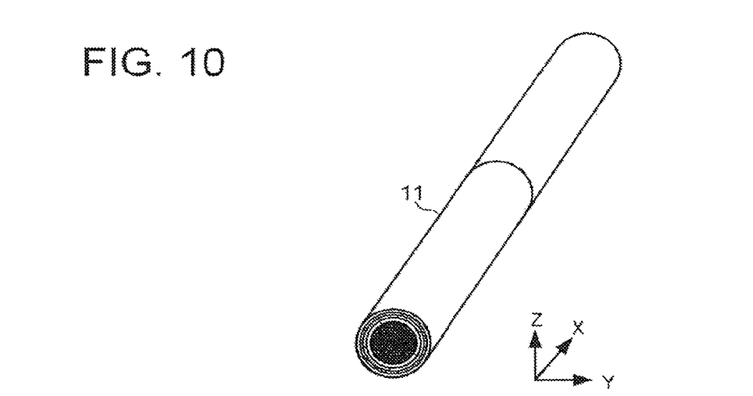
FIG. 10 is a schematic view illustrating another structure example of the electrochemical reaction device.
Figure 11:
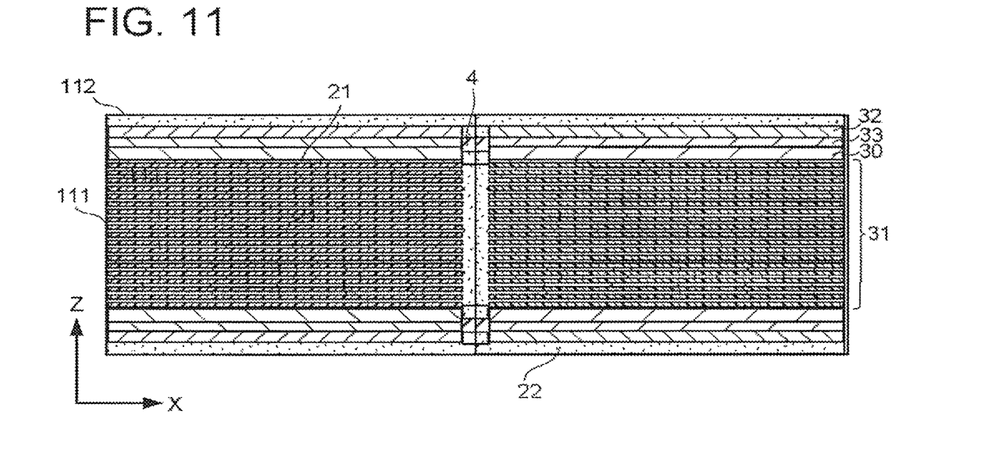
FIG. 11 is a schematic view illustrating the other structure example of the electrochemical reaction device.
Figure 12:
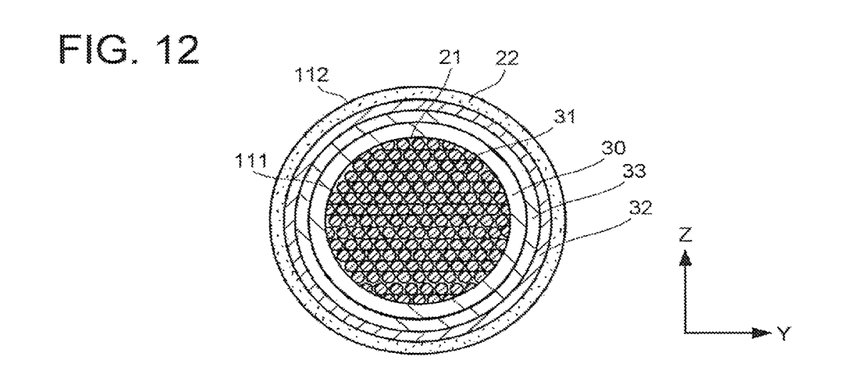
FIG. 12 is a schematic view illustrating the other structure example of the electrochemical reaction device.

FIG. 10 is a schematic view illustrating another structure example of the electrochemical reaction device. The electrochemical reaction device illustrated in FIG. 10 includes the structure of the electrochemical reaction device described with reference to FIG. 1 to FIG. 5 and in addition, its electrolytic solution tank 11 has a cylindrical shape having a length along the X-axis direction. FIG. 11 is a schematic X-Z cross-sectional view of the electrochemical reaction device illustrated in FIG. 10. FIG. 12 is a schematic Y-Z cross-sectional view of the electrochemical reaction device illustrated in FIG. 10. The electrochemical reaction device further includes a plurality of conductive substrates 30, one electrode 31, a plurality of electrodes 32, a plurality of photoelectric conversion bodies 33, and current-carrying members 7. The electrolytic solutions are supplied to the storage part 111 and the storage part 112 in the X-axis direction.

The plural conductive substrates 30 are arranged along the X-axis direction in the storage part 111. The plural electrodes 32 are arranged along the X-axis direction on the corresponding conductive substrates 30 respectively. The plural photoelectric conversion bodies 33 are arranged along the X-axis direction in the storage part 111. The conductive substrates 30 and the electrodes 32 each extend along an inner peripheral surface of the electrolytic solution tank 11 having the cylindrical shape. Incidentally, the conductive substrates 30 and the electrodes 32 each may be disposed as a plurality of divided portions along the inner peripheral surface of the electrolytic solution tank 11.

The fluid permeable conductor of the electrode 31 overlies the plural electrodes 32. The fluid permeable conductor is closer to the X-axis direction center axis of the electrolytic solution tank 11 than the plural electrodes 32 are. With the above-described structure, the fluid permeable conductor is filled and fixed in the storage part 111.

In the electrochemical reaction devices described with reference to FIG. 7 to FIG. 12, it is possible for the electrolytic solutions to easily flow because the electrolytic solution tank 11 is formed to extend along the flow direction of the electrolytic solutions.

The above-described embodiments have been presented by way of example only, and are not intended to limit the scope of the inventions. Indeed, the novel embodiments described herein may be embodied in a variety of other forms; furthermore, various omissions, substitutions, and changes may be made without departing from the spirit of the inventions. The accompanying claims and their equivalents are intended to cover such forms or modifications as would fall within the scope and spirit of the inventions.

What is claimed is:

1. An electrochemical reaction device comprising:
   an electrolytic solution tank including
   a first inlet,
   a first outlet,
   a first room connected to the first inlet and the first outlet, the first room being capable of storing a first electrolytic solution containing a first substance including carbon dioxide,
   a second inlet,
   a second outlet, and
   a second room connected to the second inlet and the second outlet, the second room being capable of storing a second electrolytic solution containing a second substance;
   a first electrode in the first room to reduce the first substance;
   a second electrode in the second room to oxidize the second substance; and
   a generator electrically connected to the first and second electrodes,
   wherein the first electrode includes
   a plurality of conductive fibers and at least one gap between the adjacent conductive fibers,
   the conductive fibers extend from the first inlet to the first outlet, and
   the at least one gap works as a flow path through which the first electrolytic solution flows from the first inlet to the first outlet.

2. The electrochemical reaction device of claim 1, wherein the maximum width of the at least one gap is not less than 0.01 mm nor more than 0.1 mm.

3. The electrochemical reaction device of claim 1, wherein the conductive fibers are carbon fibers.

4. The electrochemical reaction device of claim 1, wherein the conductive fibers are metal fibers.

5. The electrochemical reaction device of claim 4, wherein the metal fibers each comprises at least one element selected from gold, silver, platinum, copper, zinc, palladium, and nickel.

6. The electrochemical reaction device of claim 2, wherein the first electrode has a metal layer in contact with one of the conductive fibers.

7. The electrochemical reaction device of claim 6, wherein the metal layer comprises at least one element selected from gold, silver, platinum, copper, zinc, palladium, and nickel.

8. The electrochemical reaction device of claim 1, wherein the first electrode has a modifier organic molecule bonded to the surface one of the conductive fibers, the modifier organic molecule including a quaternary cation.

9. The electrochemical reaction device of claim 1, wherein the second electrode includes a second conductor having a second flow path penetrates through the second conductor.

10. The electrochemical reaction device of claim 1, wherein the generator includes a photoelectric conversion layer having a first surface electrically connected to the first electrode and a second surface electrically connected to the second electrode.

11. The electrochemical reaction device of claim 1, wherein the second substance includes water.

12. The electrochemical reaction device of claim 1, further comprising:
   a plurality of the second electrodes arranged along one direction of the electrolytic solution tank in the second room; and
   a channel connecting the first room and the outside of the electrolytic solution tank along the one direction,
   wherein the conductor overlies the plural second electrodes.

13. The electrochemical reaction device of claim 12, wherein the electrolytic solution tank has a cylindrical shape having a length along the one direction,
   wherein the plural second electrodes each extend along an inner peripheral surface of the electrolytic solution tank, and
   wherein the conductor is closer to a center axis of the electrolytic solution tank than the plural second electrodes.

14. The electrochemical reaction device of claim 1, wherein the conductive fibers extend along a direction cross the thickness direction of the first electrode.

15. The electrochemical reaction device of claim 1, wherein each of the gaps branches and extends three-dimensionally.

16. The electrochemical reaction device of claim 1, further comprising
a conductive member penetrating through the first electrode to fix the conductive fibers.

17. An electrochemical reaction device comprising:
a cylindrical tank including
  a first inlet,
  a first outlet,
  a first room connected to the first inlet and the first outlet, the first room being capable of storing a first electrolytic solution containing a first substance including carbon dioxide,
  a second inlet,
  a second outlet, and
  a second room connected to the second inlet and the second outlet, the second room surrounding the first room along an inner peripheral surface of the tank, and the second room being capable of storing a second electrolytic solution containing a second substance;
a first electrode in the first room to reduce the first substance;
a second electrode in the second room to oxidize the second substance; and
a generator connected to the first and second electrodes,
wherein the first electrode includes a plurality of conductive fibers and at least one gap between the adjacent conductive fibers,
the conductive fibers extend from the first inlet to the first outlet,
the conductive fibers are surrounded by the second electrode, and
the at least one gap works as a flow path through which the first electrolytic solution flows from the first inlet to the first outlet.

* * * * *